(12) United States Patent
Bono et al.

(10) Patent No.: US 11,506,245 B2
(45) Date of Patent: Nov. 22, 2022

(54) CONSTANT VELOCITY JOINT

(71) Applicant: HONDA MOTOR CO., LTD., Tokyo (JP)

(72) Inventors: Yasuharu Bono, Tokyo (JP); Taisuke Sakakibara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 356 days.

(21) Appl. No.: 16/718,230

(22) Filed: Dec. 18, 2019

(65) Prior Publication Data

US 2020/0208685 A1 Jul. 2, 2020

(30) Foreign Application Priority Data

Dec. 28, 2018 (JP) .............................. JP2018-246530

(51) Int. Cl.
*F16D 3/202* (2006.01)
*F16D 3/30* (2006.01)
*F16D 3/205* (2006.01)

(52) U.S. Cl.
CPC ........... *F16D 3/202* (2013.01); *F16D 3/2055* (2013.01); *F16D 3/30* (2013.01); *F16D 2003/2026* (2013.01); *Y10S 464/905* (2013.01)

(58) Field of Classification Search
CPC .......... F16D 3/202; F16D 3/2055; F16D 3/30; F16D 2003/2026; Y10S 464/905
USPC ................................................. 464/111, 124
See application file for complete search history.

(56) References Cited

U.S. PATENT DOCUMENTS

| | | | | |
|---|---|---|---|---|
| 9,618,055 | B2* | 4/2017 | Tsujimoto | ............. F16D 3/2055 |
| 9,951,822 | B2* | 4/2018 | Tsujimoto | ............. F16D 3/2055 |
| 10,100,877 | B2* | 10/2018 | Beigang | ................ F16D 3/2055 |
| 2010/0273561 | A1* | 10/2010 | Wakamatsu | .......... F16D 3/2055 |
| | | | | 464/111 |
| 2015/0219165 | A1 | 8/2015 | Tsujimoto et al. | |

FOREIGN PATENT DOCUMENTS

| | | |
|---|---|---|
| JP | 10-184715 | 7/1998 |
| JP | 5934266 | 8/2015 |

OTHER PUBLICATIONS

Japanese Office Action for Japanese Patent Application No. 2018-246530 dated Nov. 9, 2021.

* cited by examiner

*Primary Examiner* — Greg Binda
(74) *Attorney, Agent, or Firm* — Amin, Turocy & Watson, LLP

(57) ABSTRACT

In a lateral cross section passing through a center of a trunnion in the form of a retaining member that constitutes part of a constant velocity joint, and an orthogonal site where a virtual tangent line at a contact region is perpendicular to a longitudinal direction of a guide groove, a curved surface having a first arcuate portion and a second arcuate portion is formed. The second arcuate portion is contiguous with the first arcuate portion, and has a smaller radius of curvature than the first arcuate portion. Further, the first arcuate portion and the second arcuate portion are arranged in this order from a side in proximity to an annular member of the trunnion.

4 Claims, 15 Drawing Sheets

CONSTANT VELOCITY JOINT

CROSS-REFERENCE TO RELATED APPLICATION

This application is based upon and claims the benefit of priority from Japanese Patent Application No. 2018-246530 filed on Dec. 28, 2018, the contents of which are incorporated herein by reference.

BACKGROUND OF THE INVENTION

Field of the Invention

The present invention relates to a constant velocity joint, which is interposed between a first transmission shaft and a second transmission shaft, for transmitting rotary drive power from the first transmission shaft to the second transmission shaft.

Description of the Related Art

In an automobile, rotary drive power, which is generated by an internal combustion engine, an electric motor, or the like, is transmitted to the tires by drive power transmission shafts such as drive shafts, etc. In this case, the automobile is driven when the tires are rotated by the transmitted rotary drive power.

A constant velocity joint is interposed between the drive power transmission shafts. The constant velocity joint interconnects the drive power transmission shafts in a manner so that the drive power transmission shafts can rotate about respective axes thereof.

One known type of constant velocity joint is a tripod type constant velocity joint. Such a tripod type constant velocity joint comprises an outer member having a bottomed cup, and an inner member that is fitted to the distal end of a drive power transmission shaft. Rollers, which are held by holders of the inner member, slide while rotating within respective guide grooves defined in an inner wall of the bottomed cup. Further, when the drive power transmission shafts are inclined at a predetermined working angle, the rollers are inclined within the guide grooves in following relation to the inner member being tilted inside of the outer member.

In the foregoing manner, in such a tripod type constant velocity joint, although the rollers generally rotate, slide, and tilt, when the roller is inclined, the rollers become restrained by the guide grooves. If sliding takes place in this state, slippage occurs between the wall surfaces of the guide grooves and the rollers, and as a result, sliding resistance is increased. Such sliding resistance also increases as the rollers rotate.

The increase in sliding resistance becomes a cause of vibration and abnormal noise. Thus, in Japanese Patent No. 5934266, the applicant of the present invention has proposed a constant velocity joint, which is capable of reducing induced thrust caused by sliding resistance.

SUMMARY OF THE INVENTION

A principal object of the present invention is to provide a constant velocity joint, which is capable of reducing sliding resistance insofar as possible.

According to an embodiment, a constant velocity joint is interposed between a first transmission shaft and a second transmission shaft, and is adapted to transmit rotary drive power from the first transmission shaft to the second transmission shaft. The constant velocity joint includes an outer member in which a plurality of guide grooves, which are spaced apart from each other at predetermined intervals and extend along an axial direction of the outer member, are formed on an inner side wall thereof, the outer member being coupled to the first transmission shaft; an inner member having retaining members, which project respectively from an annular member toward the guide grooves, the inner member being coupled to the second transmission shaft and inserted into the outer member; a plurality of roller assemblies each having an inner roller, and an outer roller mounted via rolling members outwardly of the inner roller. A plurality of contact portions, which abut against an inner circumferential wall of the inner roller, and a plurality of non-contact portions, which are separated from the inner circumferential wall of the inner roller, are disposed respectively on each of the retaining members, and the contact portions and the non-contact portions are alternately arranged. The contact portions are at least a parallel site in which a virtual tangent line is in parallel with a longitudinal direction of the guide grooves, and a orthogonal site in which a virtual tangent line on the contact portion are perpendicular with respect to the longitudinal direction of the guide grooves; and in a lateral cross section of each of the retaining members passing through a center of the retaining members and the orthogonal site, the orthogonal site includes a curved surface shape having in this order from a side in proximity to the annular member a first arcuate portion, and a second arcuate portion continuous from the first arcuate portion and having a radius of curvature smaller than a radius of curvature of the first arcuate portion.

According to the present invention, when the inner member is inclined at a predetermined working angle, the second arcuate portion having the smaller diameter in the retaining members is placed in contact with the inner roller. Therefore, the roller assembly being lifted and inclined with respect to the guide grooves is avoided. Accordingly, since resistance to rotation of the roller assembly is prevented from increasing, induced thrust can also be decreased. Further, the efficiency with which the rotary drive power is transmitted is enhanced.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 14 is an enlarged cross-sectional view of principal components showing a state in which the trunnion shown in FIGS. 5 to 7 and FIGS. 9 to 11 is inclined.

DESCRIPTION OF THE PREFERRED EMBODIMENTS

A constant velocity joint according to a preferred embodiment of the present invention will be presented and described in detail below with reference to the accompanying drawings.

Figure 1:
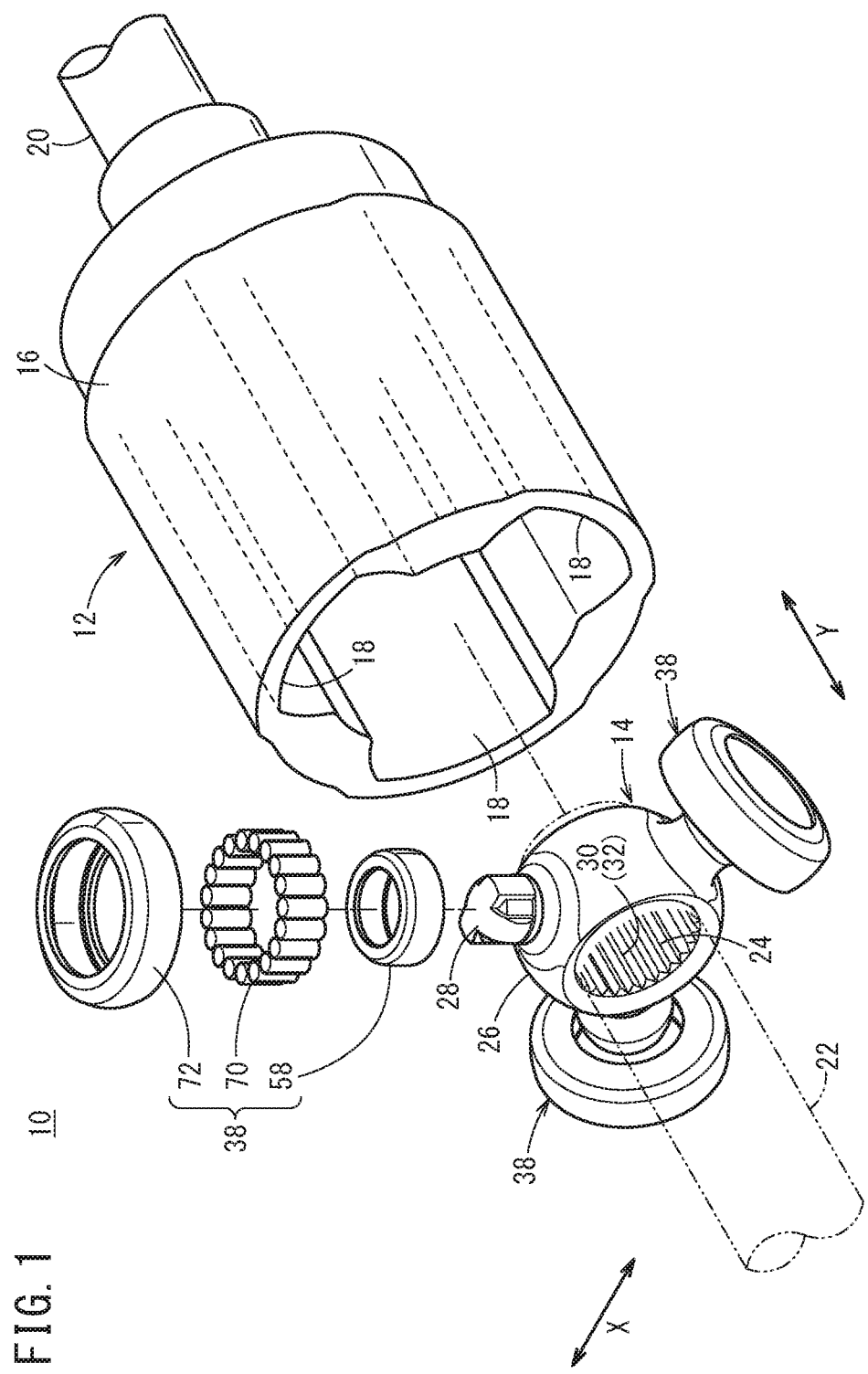
FIG. 1 is a schematic exploded perspective view of a constant velocity joint according to an embodiment of the present invention.
Figure 2:
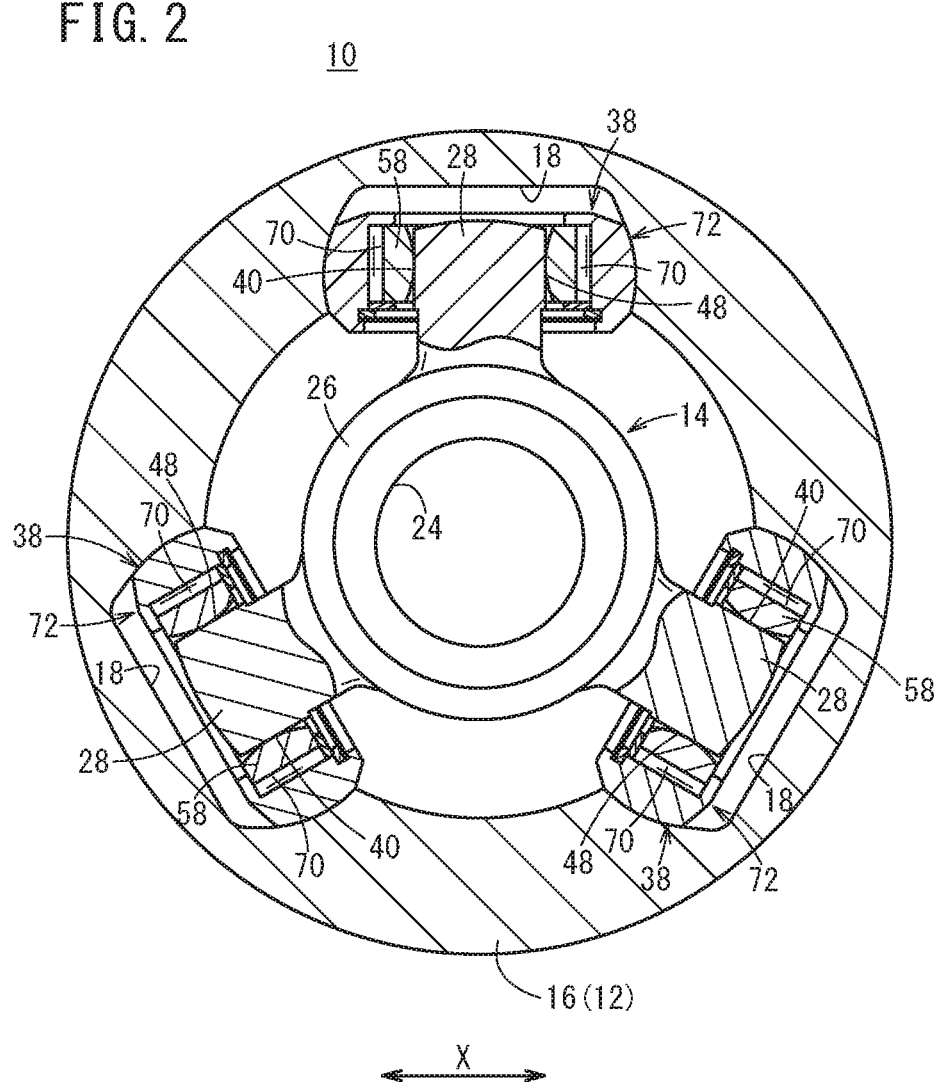
FIG. 2 is a schematic front cross-sectional view of the constant velocity joint shown in FIG. 1.

FIGS. 1 and 2 are a schematic exploded perspective view and a schematic front cross-sectional view, respectively, of a constant velocity joint 10 according to an embodiment of the present invention. The constant velocity joint 10 comprises an outer member 12 and an inner member 14. In FIG. 1, the arrow X represents a widthwise or transverse direction of the outer member 12, and the arrow Y represents a longitudinal direction. The X direction and the Y direction are perpendicular to each other.

The outer member 12 includes a cup part 16 having a bottomed cylindrical shape, and three guide grooves 18 are provided on an inner wall of the cup part 16 so as to have a phase difference of 120°. Each of the guide grooves 18 opens at one end of the cup part 16, together with extending to the bottom wall along the longitudinal direction of the cup part 16. A shaft member 20 (first transmission shaft) which extends along the longitudinal direction of the outer member 12 is connected to the exterior of the bottom wall. The shaft member 20 is connected, for example, to a rotating shaft of a non-illustrated transmission, and transmits the rotary drive power to a second transmission shaft 22 via the cup part 16 and the inner member 14.

On the other hand, the inner member 14 includes an annular member 26 having a ring-like shape by forming a through hole 24 in a disk-shaped body, and three trunnions 28 (retaining members) which are formed to protrude from a side wall of the annular member 26. Moreover, the through hole 24 is formed to extend in a direction along the direction in which the cup part 16 and the second transmission shaft 22 extend. Splines 30 that extend along the axial direction of the through hole 24 are provided on the inner wall of the through hole 24.

When the distal end of the second transmission shaft 22 is passed through the through hole 24, the splines 30 enmesh with the splines 32 provided on the side circumferential wall of the second transmission shaft 22. In this manner, the splines 30 and 32 are engaged with each other, whereby the second transmission shaft 22 and the inner member 14 are connected.

The adjacent trunnions 28 are separated from each other by 120°, and accordingly, the phase difference between the trunnions 28 coincides with the phase difference between the guide grooves 18. In addition, the respective trunnions 28 extend toward the guide grooves 18. Further, roller assemblies 38 are rotatably mounted on the trunnions 28, respectively.

Figure 3:
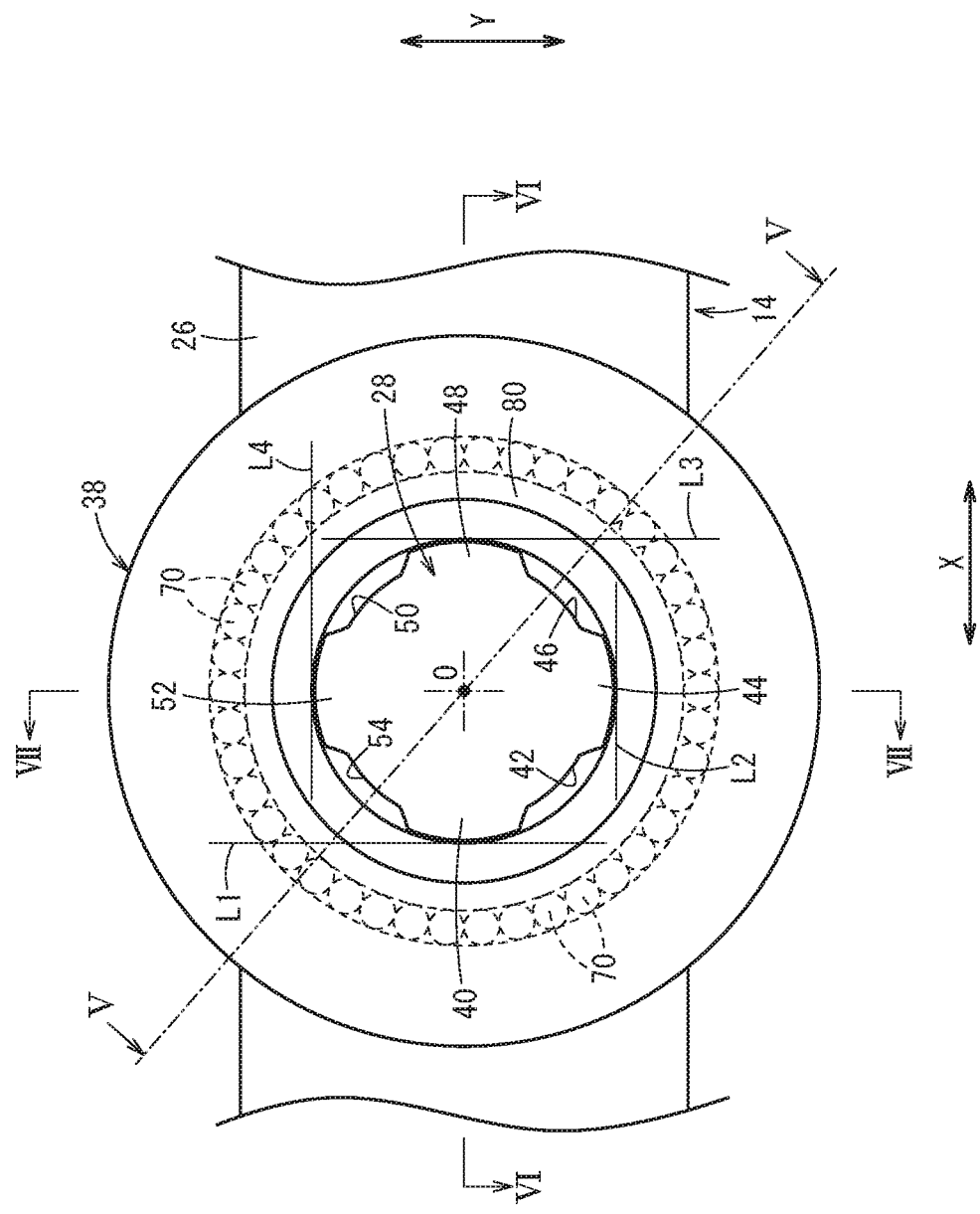
FIG. 3 is a plan view of a trunnion (retaining member) with a roller assembly mounted thereon.
Figure 4:
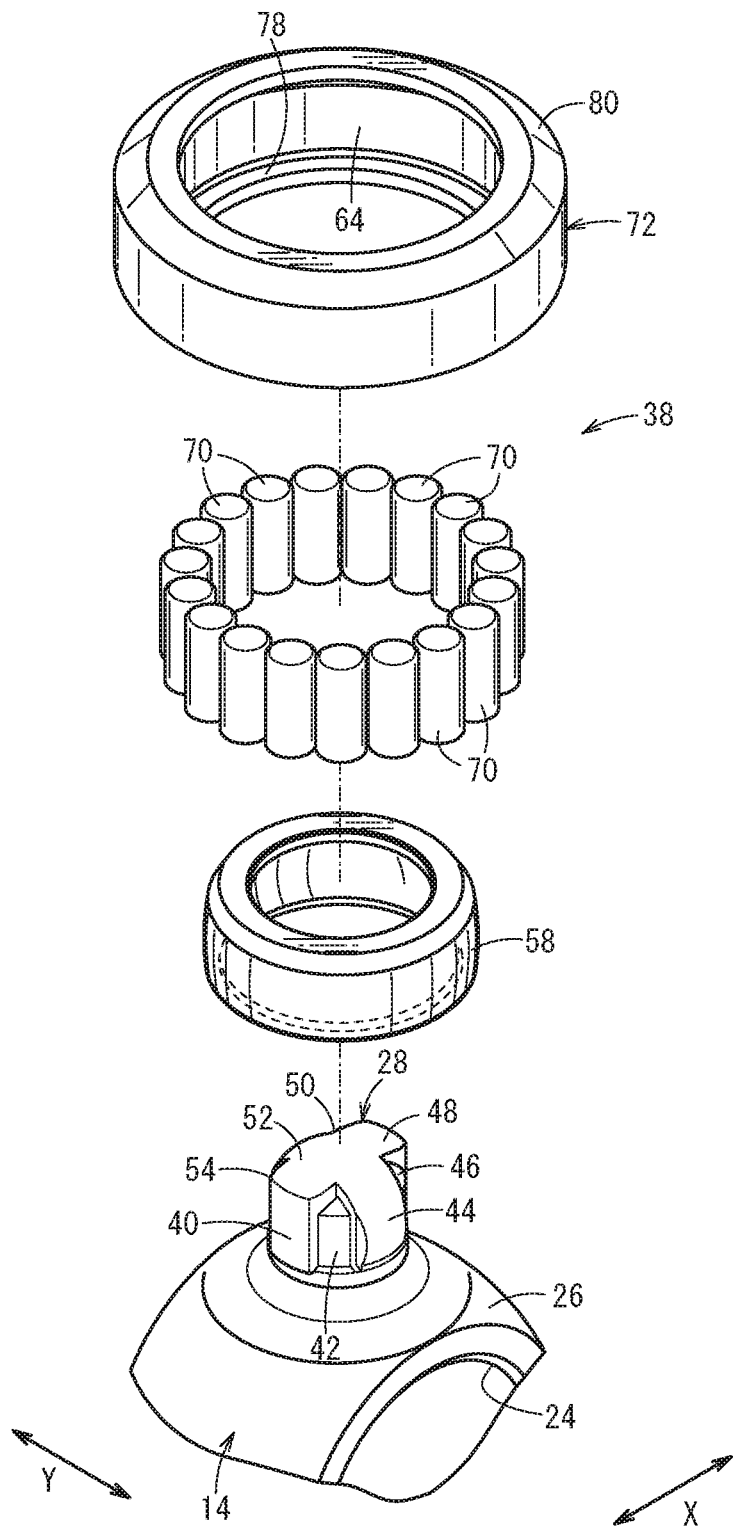
FIG. 4 is an exploded perspective view of the roller assembly and the trunnion in a disassembled state.

FIG. 3 is a plan view of one of the trunnions 28 on which one of the roller assemblies 38 is rotatably mounted, and FIG. 4 is an exploded perspective view of the trunnion 28 and the roller assembly 38 in a disassembled state. The X and Y directions shown in FIGS. 3 and 4 correspond respectively with the X and Y directions shown in FIG. 1.

The shape of the trunnion 28 will be described in detail below. The trunnion 28 includes a first lobe 40, a first recess 42, a second lobe 44, a second recess 46, a third lobe 48, a third recess 50, a fourth lobe 52, and a fourth recess 54, which are arranged in succession. More specifically, the lobes and the recesses are arranged alternately, and accordingly, the side wall of the trunnion 28 has an undulating shape along the radial direction. Due to such an undulating shape, the trunnion 28 is of a substantially cross-like shape as viewed in plan (see FIG. 3).

Only the curved side surfaces of the first lobe 40, the second lobe 44, the third lobe 48, and the fourth lobe 52 of the trunnion 28 come into abutment against the inner circumferential wall of the inner roller 58 that constitutes the roller assembly 38. On the other hand, the surfaces of the trunnion 28 that define the first recess 42, the second recess 46, the third recess 50, and the fourth recess 54 are spaced from the inner circumferential wall of the inner roller 58. More specifically, the first lobe 40, the second lobe 44, the third lobe 48, and the fourth lobe 52 serve as contact regions, which abut against the inner circumferential wall of the inner roller 58, whereas the first recess 42, the second recess 46, the third recess 50, and the fourth recess 54 serve as non-contact regions, which are distanced from the inner circumferential wall (i.e., held out of abutment with the inner circumferential wall) of the inner roller 58.

As shown in FIG. 3, hypothetical tangential lines L1, L2, L3, and L4 are drawn tangentially to the first lobe 40, the second lobe 44, the third lobe 48, and the fourth lobe 52. The hypothetical tangential line L1 to the first lobe 40 and the hypothetical tangential line L3 to the third lobe 48 extend in parallel with the Y direction, whereas the hypothetical tangential line L2 to the second lobe 44 and the hypothetical tangential line L4 to the fourth lobe 52 extend in parallel with the X direction. Since the X direction is perpendicular to the Y direction, the hypothetical tangential lines L2 and L4 are perpendicular to the Y direction.

As can be understood from the above, the first lobe 40 and the third lobe 48 serve as parallel regions where the hypothetical tangential lines L1 and L3 extend in parallel with the longitudinal direction of the guide grooves 18. The second lobe 44 and the fourth lobe 52 serve as perpendicular regions where the hypothetical tangential lines L2 and L4 extend perpendicularly to the longitudinal direction of the guide grooves 18. As a result, on the trunnions 28, the first lobe 40 and the third lobe 48, which serve as parallel regions, and the second lobe 44 and the fourth lobe 52, which serve as perpendicular regions, come into abutment against the inner circumferential wall of the inner roller 58.

Figure 5:
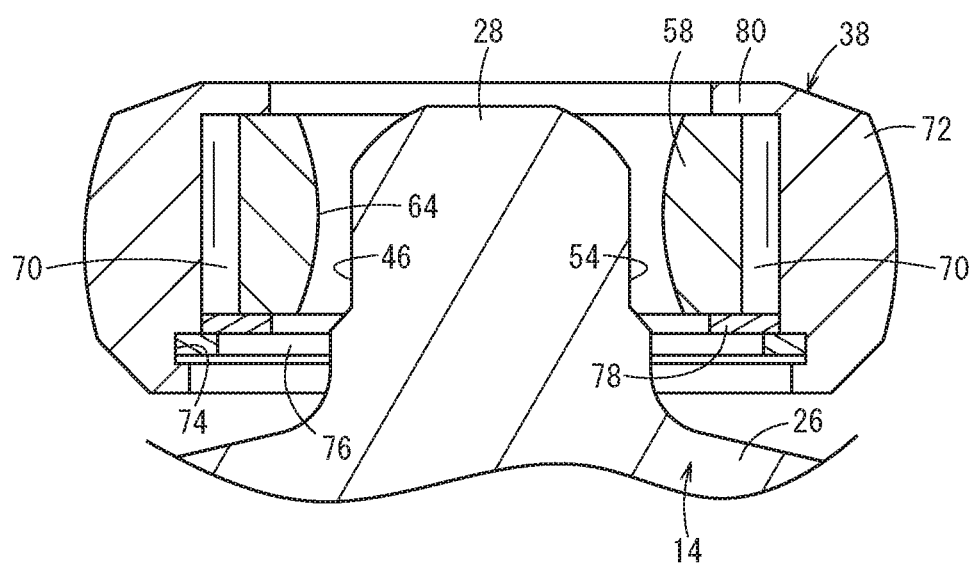
FIG. 5 is a cross-sectional view taken along line V-V of FIG. 3.
Figure 6:
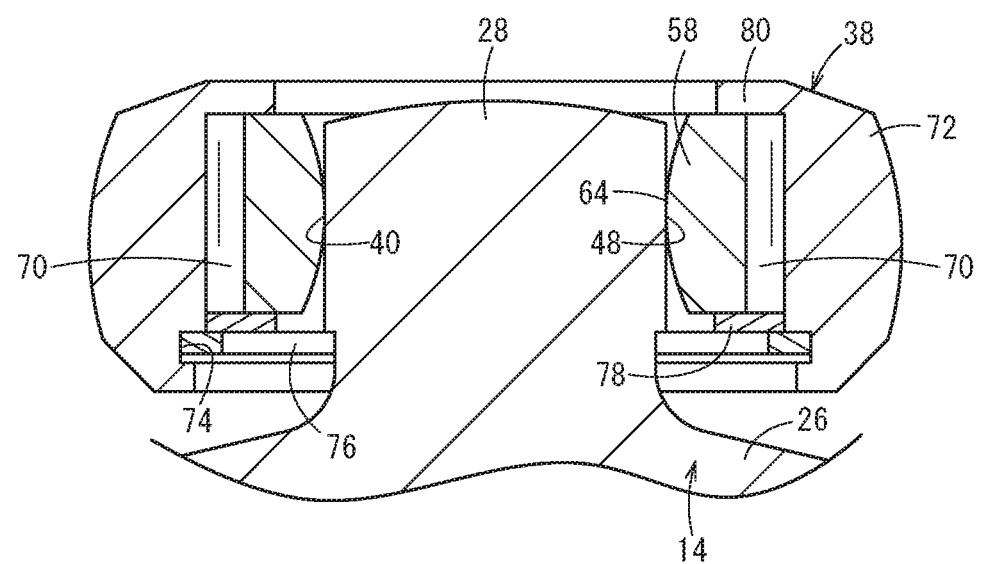
FIG. 6 is a cross-sectional view taken along line VI-VI of FIG. 3.
Figure 7:
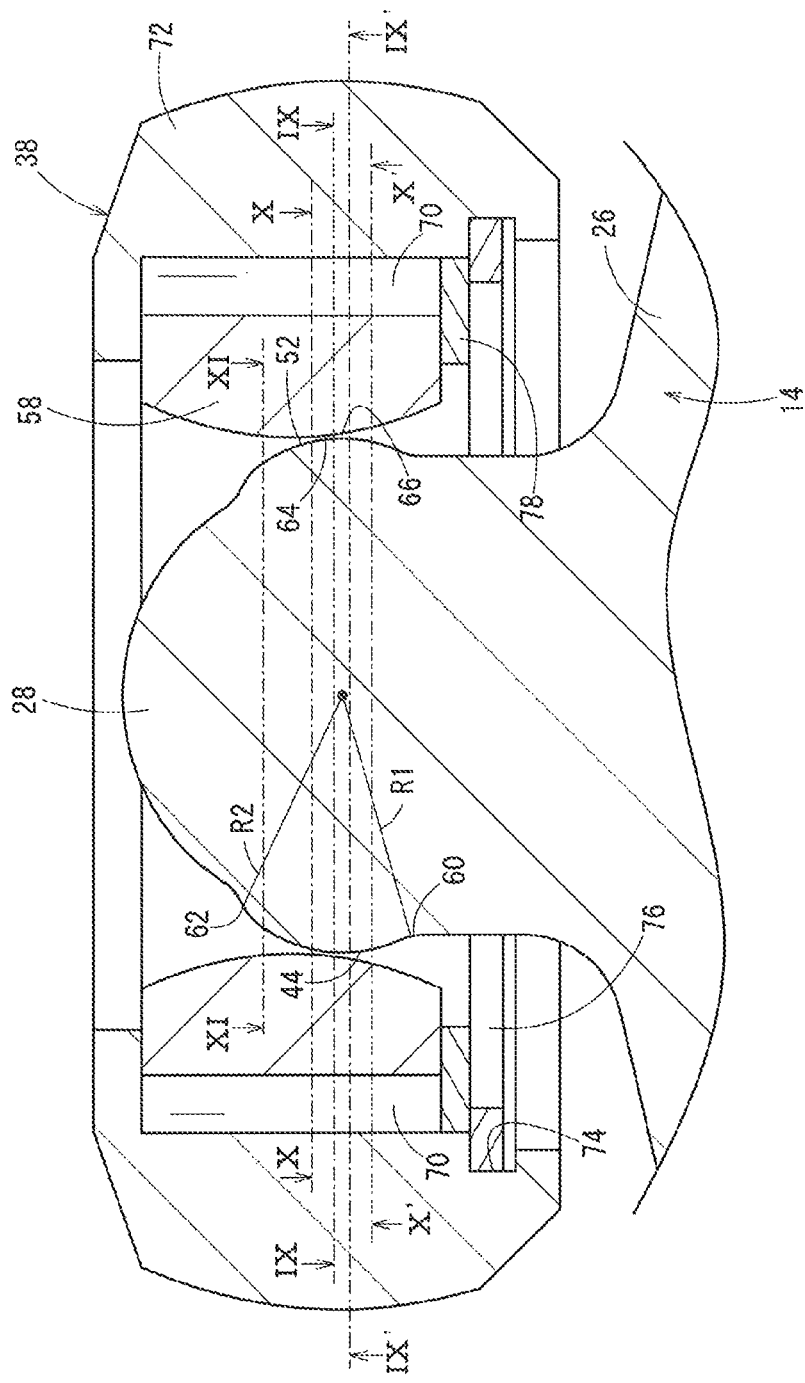
FIG. 7 is a cross-sectional view taken along line VII-VII of FIG. 3.

FIGS. 5, 6, and 7 are cross-sectional views taken along line V-V, line VI-VI, and line VII-VII, respectively, of FIG. 3. As shown in FIG. 3, all of the lines V-V, VI-VI, and VII-VII pass through a central point O on the upper end surface of the trunnion 28. Further, as can be seen from FIG. 5, the second recess 46 and the fourth recess 54, which serve as non-contact regions, are distanced from the inner circumferential wall of the inner roller 58.

As shown in FIG. 6, the first lobe 40 and the third lobe 48 are of a substantially constant diameter from a proximal end portion adjacent to the annular member 26 to a distal end portion. Therefore, in a cross-sectional view taken along line VI-VI through the central point O and the third lobe 48, the side walls of the trunnions 28 are of a straight line shape.

Furthermore, as shown in FIG. 7, the second lobe 44 and the fourth lobe 52 are curved surface shapes in which a first arcuate portion 60 and a second arcuate portion 62 are connected in this order from a side in proximity to the annular member 26. The first arcuate portion 60 is a portion of a spherical surface centered about the central point O of the trunnion 28, and the radius of curvature thereof is R1. On the other hand, the radius of curvature of the second arcuate portion 62 is set to R2, which is smaller than the radius of curvature R1. The radius of curvature R2 of the second arcuate portion 62 is set to a size so that the first arcuate portion 60 is not separated from the inner wall (for example, at a minimum inner diameter portion 64 having a minimum inner diameter at a substantially central portion in a heightwise direction (axial direction)) of the inner roller 58 when the working angle of the inner member 14 becomes maximum.

Figure 8:
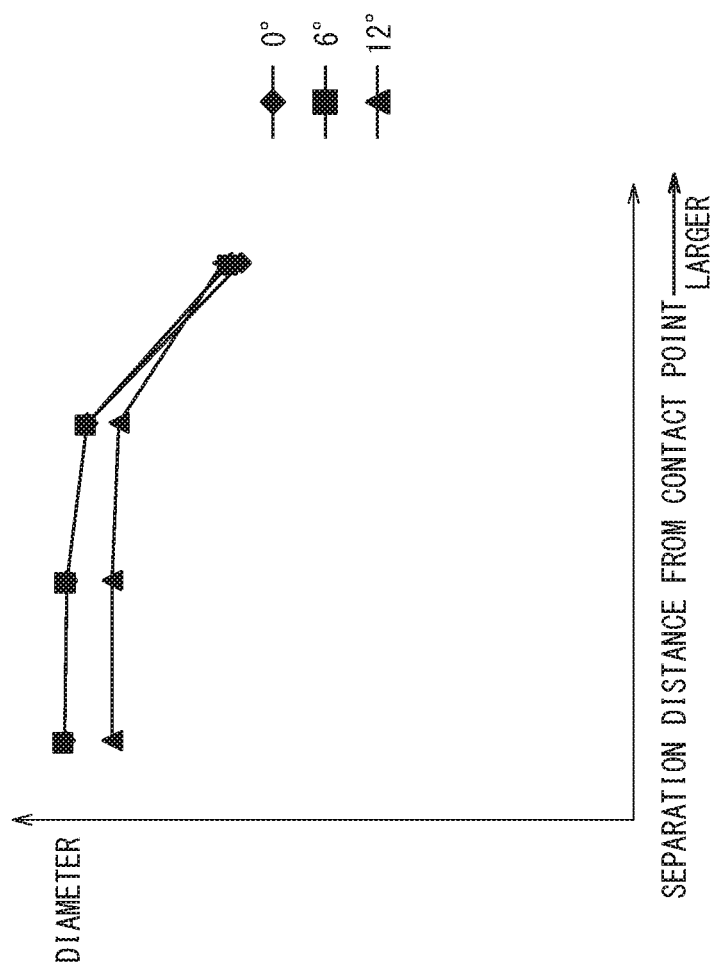
FIG. 8 is a graph showing a relationship between a diameter and a separation distance from a contact point of the trunnion with respect to the roller assembly at each of respective cutting angles.

Therefore, as shown in FIG. 8, the diameter of the contact point that contacts the minimum inner diameter portion 64 becomes the largest in size, and the trunnion 28 becomes smaller in diameter as the distance thereof separates away from the contact point. Moreover, in FIG. 8, the angles "0°", "6°", and "12°" represent angles of inclination (cutting angles) of the inner member 14 with respect to the longitudinal direction of the outer member 12.

Figure 9:
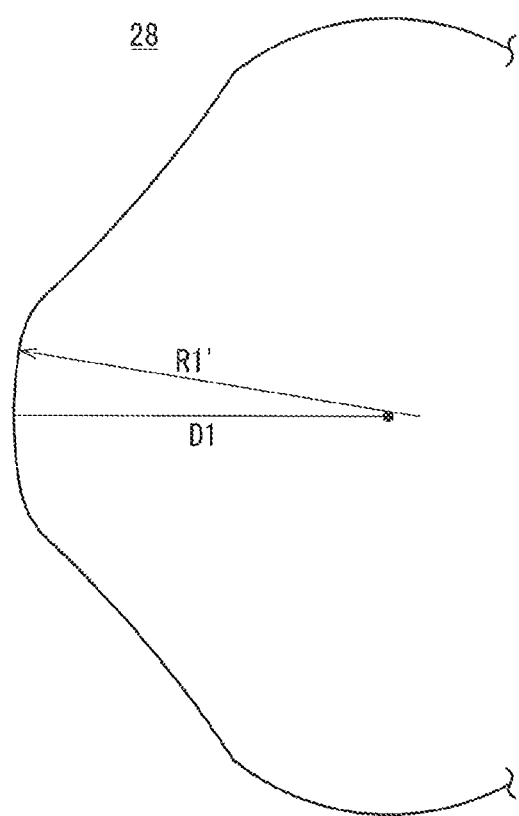
FIG. 9 is a cross-sectional view taken along lines IX-IX and IX'-IX' in FIG. 7.
Figure 10:
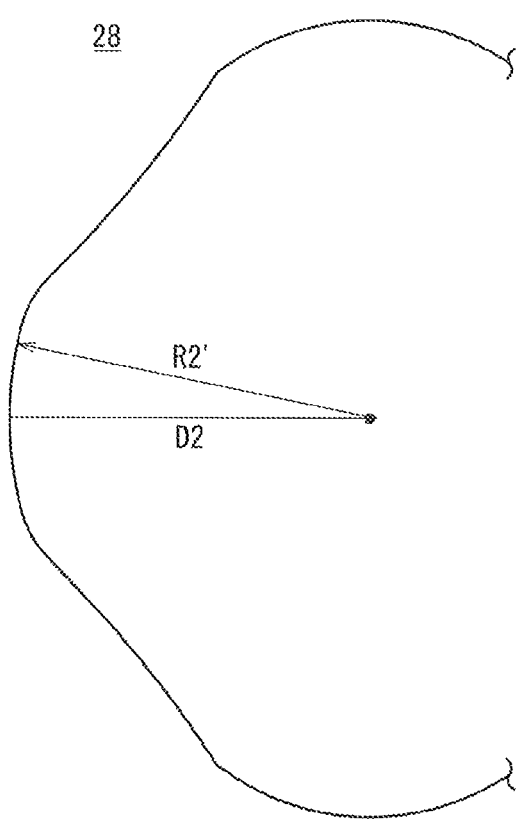
FIG. 10 is a cross-sectional view taken along lines X-X and X'-X' in FIG. 7.
Figure 11:
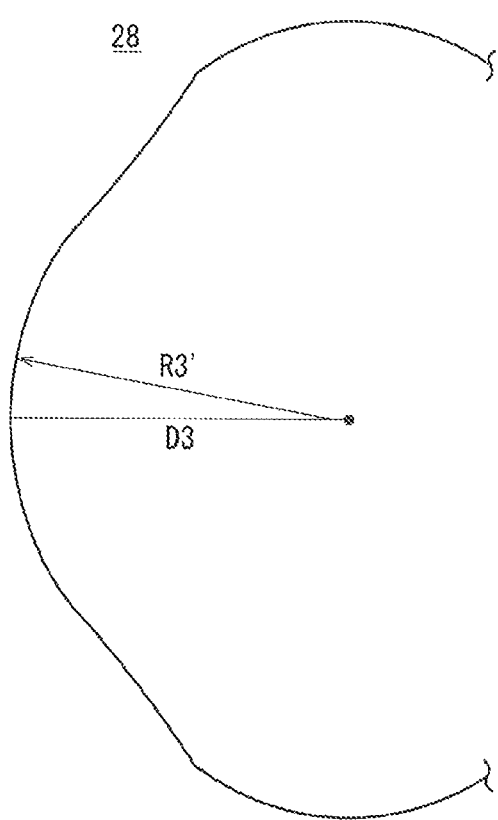
FIG. 11 is a cross-sectional view taken along lines XI-XI and XI'-XI' in FIG. 7.

FIGS. 9 to 11 are cross-sectional views taken along line IX-IX (and IX'-IX'), line X-X (and X'-X'), and line XI-XI, respectively, of FIG. 7. As can be understood from FIGS. 9 to 11, horizontal cross sections at positions separated by the same distance vertically in the axial direction from an apex 66 that protrudes maximally in the horizontal direction (direction of the arrow X) are of the same shape. In this instance, an upper direction in the axial direction is a direction away from the annular member 26, whereas a lower direction in the axial direction is a direction in proximity to the annular member 26. Further, the horizontal direction signifies a direction perpendicular to the axial direction of the trunnion 28.

In FIGS. 9 to 11, there are shown together distances D1 to D3 from the center to a most frontward surface in the horizontal direction, and distance ratio radii R1' to R3'. In this case, the relationship D1>D2>D3 is satisfied, and the relationship R1'>R2'>R3' is satisfied. More specifically, the trunnion 28 gradually decreases in diameter as it proceeds vertically (up and down) in the axial direction from the apex 66.

The roller assembly 38 includes the inner roller 58, and a cylindrical outer roller 72 that is fitted over the inner roller 58 through a plurality of needle bearings 70 (rolling members). Among such elements, as shown in FIGS. 4 to 7, the inner circumferential wall of the inner roller 58 is formed in an arcuate shape, so as to bulge outwardly toward the side of the trunnion 28 progressing toward a central portion in the heightwise direction (axial direction). More specifically, the inner diameter of the inner roller 58 becomes minimal at the central portion in the heightwise direction. Concerning the inner circumferential wall of the inner roller 58, the minimum inner diameter portion 64 at the central portion in the heightwise direction abuts against the first lobe 40, the second lobe 44, the third lobe 48, and the fourth lobe 52.

Moreover, the minimum inner diameter of the inner roller 58 is slightly larger compared with the maximum outer diameter of the trunnion 28. Therefore, in actual practice, the location of contact between the inner circumferential wall of the inner roller 58 and the outer wall of the trunnion 28 takes place at either one of the two locations of the first lobe 40 and the second lobe 44 (fourth lobe 52), or the two locations of the third lobe 48 and the fourth lobe 52 (second lobe 44).

An annular groove 74 is formed on the inner circumferential wall of the outer roller 72. By fitting a circlip 76 into the annular groove 74, a retaining ring 78 is positioned and fixed in the interior of the outer roller 72. By way of the retaining ring 78 and a flange 80 that is formed on the outer roller 72, the plural needle bearings 70 are retained while being capable of rolling within the outer roller 72.

Moreover, although not illustrated, from the cup part 16 to the second transmission shaft 22, such a region is surrounded by a joint boot in which grease is enclosed.

The constant velocity joint 10 according to the present embodiment is basically configured in the manner described above. Next, advantages and effects of the constant velocity joint 10 will be described.

When the shaft member 20 is energized to rotate, the rotary driving force thereof is transmitted to the inner member 14 through the trunnions 28, which are in engagement with the guide grooves 18 of the outer member 12. The rotary driving force is further transmitted to the second transmission shaft 22 to which the inner member 14 is fitted over externally, so that ultimately, the second transmission shaft 22 is rotated in the same direction as the shaft member 20 (first transmission shaft). Furthermore, accompanying displacement of the second transmission shaft 22 along the axial direction, the roller assemblies 38 slide along the guide grooves 18 while being retained in the guide grooves 18.

With the constant velocity joint 10 according to the present embodiment, the contact points between the inner rollers 58 and the trunnions 28 take place at either one of the two locations of the first lobe 40 and the second lobe 44 (fourth lobe 52), or the two locations of the third lobe 48 and the fourth lobe 52 (second lobe 44). For example, in the case that the contact points are the first lobe 40 and the second lobe 44, vectors of the acting force are oriented in the direction in which the torque is transmitted and in the direction of movement. Consequently, a composite vector is obtained.

As a result, a gripping force acts between the roller assemblies 38 and the trunnions 28. More specifically, generation of slippage, or stated otherwise, the occurrence of sliding resistance between the roller assemblies 38 and the trunnions 28 is prevented. In comparison with the aforementioned case, sliding resistance can be reduced by this amount.

By the amount by which the sliding resistance is reduced, the thrust resistance is also reduced. In addition, since there are two individual contact points, stress is dispersed, and therefore, the trunnions 28 can be prevented from being subjected to abrasion and wear.

It is a matter of course that when the contact locations are changed from the first lobe 40 and the second lobe 44 to the third lobe 48 and the fourth lobe 52, the same advantages and effects as discussed above are realized. In addition, from the fact that the contact locations undergo movement in this manner, localized abrasion and wear of the trunnions 28 or the inner rollers 58 can be avoided.

Figure 12:
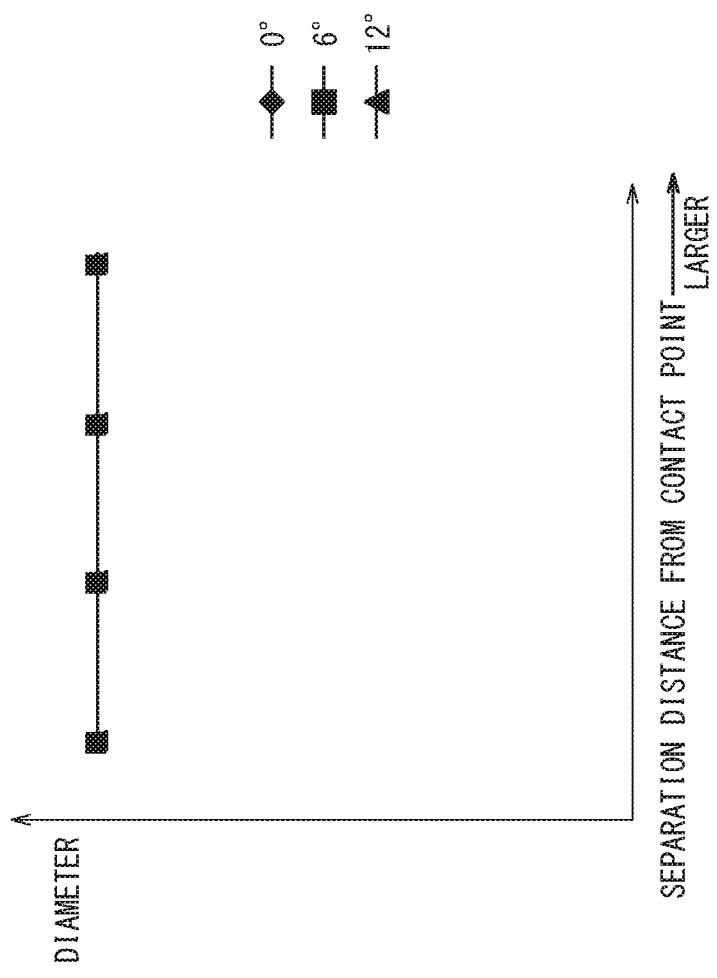
FIG. 12 is a graph showing a relationship between a diameter and a separation distance from a contact point of the trunnion having the same diameter with respect to the roller assembly.
Figure 13:
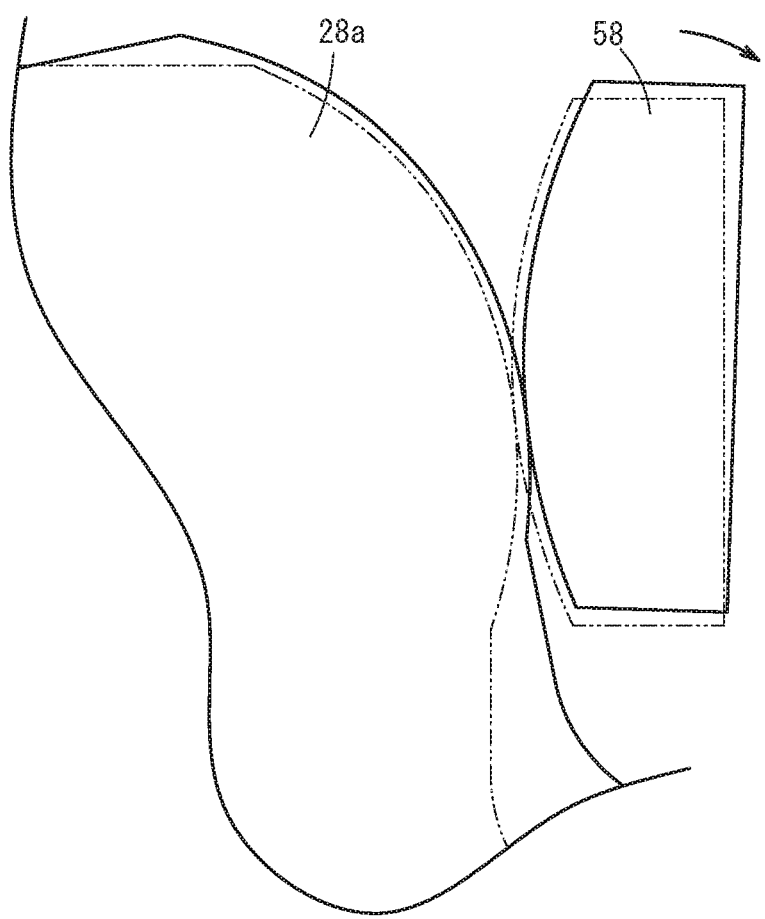
FIG. 13 is an enlarged cross-sectional view of principal components showing a state in which the trunnion shown in FIG. 12 is inclined.

In the case of a trunnion 28a having a uniform spherical shape (see FIG. 13), as shown in FIG. 12, even in the case that the cutting angle is changed, regardless of the separation distance from the contact point that abuts against the minimum inner diameter portion 64 of the inner rollers 58, the diameter thereof is the same. In this case, as shown in FIG. 13, when the second transmission shaft 22 is inclined at a predetermined working angle, the side wall pushes up on the minimum inner diameter portions 64 of the inner rollers 58. Therefore, the roller assemblies 38 are inclined with respect to the trunnion 28. More specifically, the roller assemblies 38 adopt a posture in which they are inclined with respect to the guide grooves 18.

At this time, portions of the roller assemblies 38 may locally abut against the inner walls or the like of the guide grooves 18. The abutment thereof makes it difficult for the roller assemblies 38 to slide smoothly along the track grooves, and therefore, the resistance to rotation increases. As a result, resistance is generated in opposition to movement of the roller assemblies 38 along the guide grooves 18, and in opposition to movement of the inner member 14 in a direction in which the inner member 14 protrudes or is inserted from the bottomed hole. Stated otherwise, a so-called induced thrust force is generated.

Figure 14:
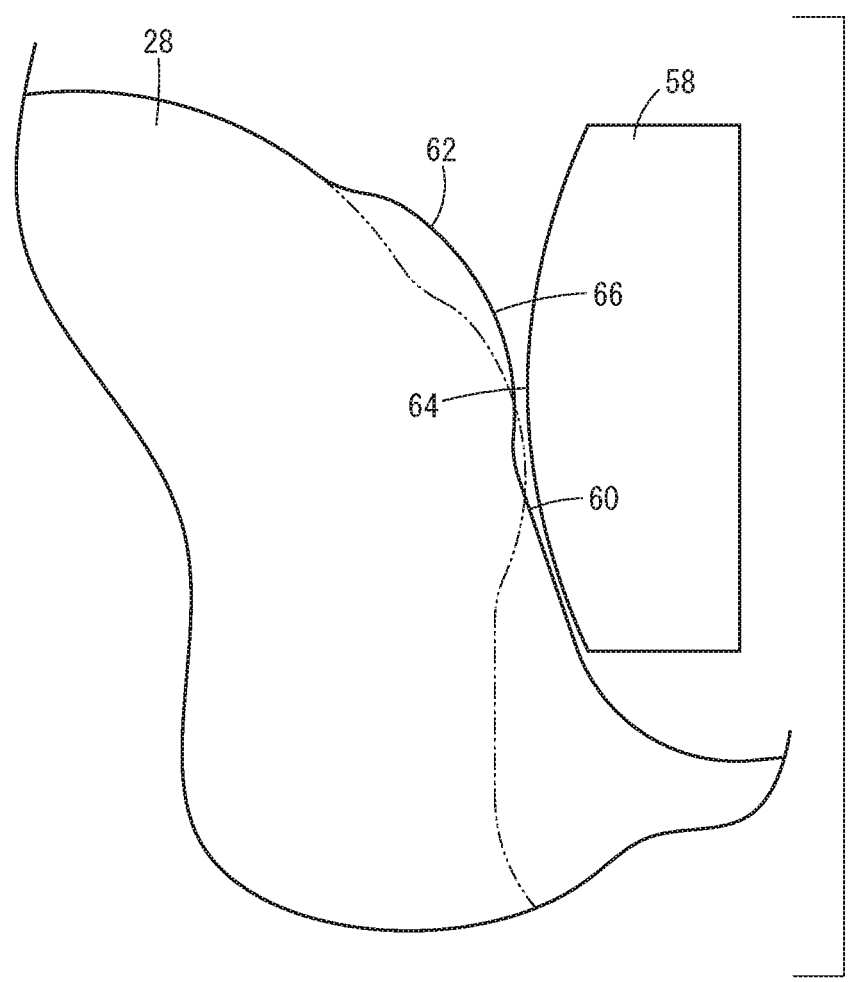

In contrast thereto, according to the present embodiment, the outer shape of the trunnions 28 is of a shape in which the second arcuate portion 62 having a smaller diameter than the first arcuate portion 60 is contiguous with the first arcuate portion 60. Further, as discussed previously, the trunnions 28 gradually decrease in diameter as they proceed vertically (up and down) in the axial direction from the apex 66 (see FIGS. 9 to 11). In combination with the above features, even when the second transmission shaft 22 is inclined at a predetermined working angle, as shown in FIG. 14, a situation is avoided in which the second arcuate portions 62 push up on the minimum inner diameter portions 64 of the inner rollers 58. For this reason, an increase in resistance to rotation is avoided. Moreover, although illustrated in an exaggerated sense in FIG. 14 in order to facilitate understanding, the inner walls of the inner rollers 58 are actually placed in contact, for example, with the first arcuate portions 60 of the trunnions 28.

In addition, the second arcuate portions 62 are placed in contact with the minimum inner diameter portions 64 of the inner rollers 58. Therefore, the roller assemblies 38 are maintained in a parallel posture with respect to the track grooves, and the driving force of the shaft member 20 is transmitted to the outer member 12, and furthermore, is transmitted to the second transmission shaft 22 via the trunnions 28 of the inner member 14 and the roller assemblies 38.

For the reasons mentioned above, according to the present embodiment, it is possible to configure the constant velocity joint 10 in a manner so that sliding resistance is low, and durability is superior.

Figure 15:
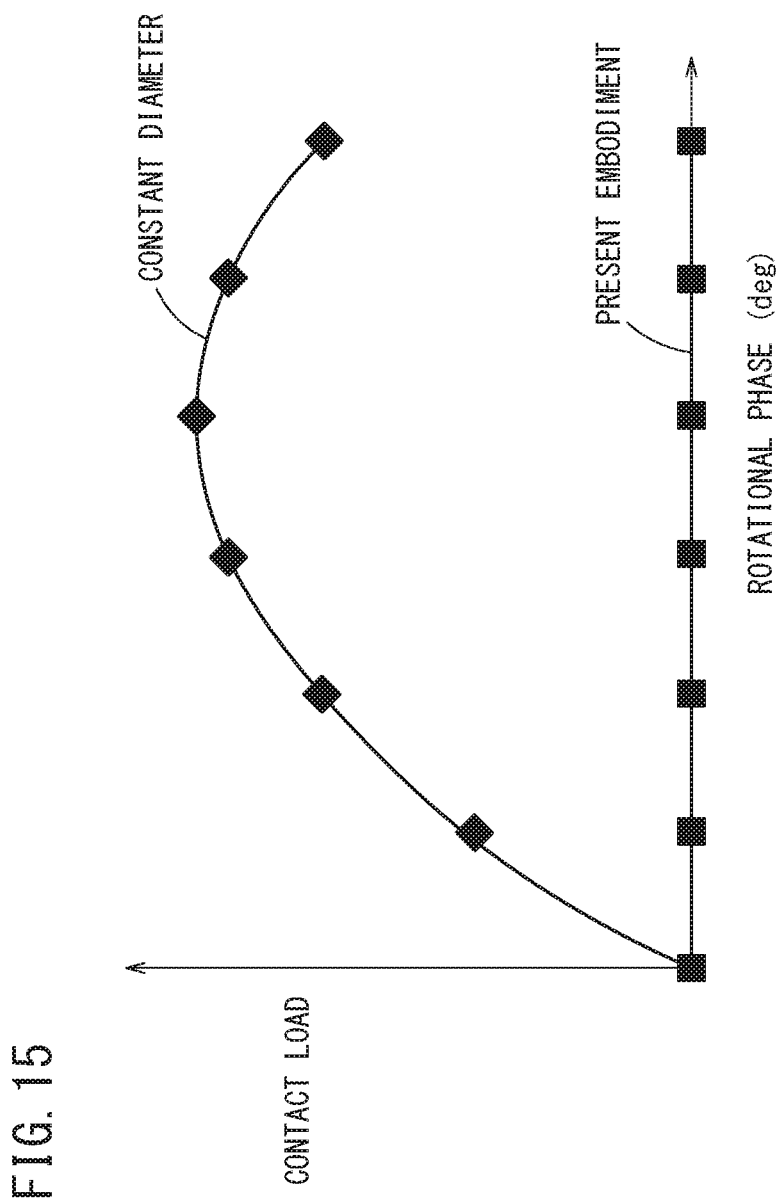
FIG. 15 is a graph showing a relationship between a rotational phase and a contact load in the trunnion shown in FIG. 12, and the trunnion shown in FIGS. 5 to 7 and FIGS. 9 to 11.

In addition, as shown in FIG. 15, in the case that the diameter is constant, the contact load applied to the trunnions 28 changes with the rotational phase of the shaft member 20, and becomes maximum when the rotational phase is on the order of 60°. In contrast thereto, when the diameter is made to change as in the present embodiment, the contact load applied to the trunnions 28 is substantially constant regardless of the rotational phase of the shaft member 20. More specifically, the load acting on the trunnions 28 is smaller in the latter case. Consequently, according to the present embodiment, resistance to abrasion and wear of the trunnions 28 can be enhanced.

The present invention is not limited to the above embodiment. Various changes and modifications may be made to the embodiment without departing from the scope of the invention as set forth in the appended claims.

For example, additional lobes may be provided between the first lobe 40 and the second lobe 44, between the second lobe 44 and the third lobe 48, between the third lobe 48 and the fourth lobe 52, and between the fourth lobe 52 and the first lobe 40, and the number of contact points between the inner roller 58 and the trunnion 28 may be increased.

What is claimed is:

1. A constant velocity joint interposed between a first transmission shaft and a second transmission shaft, and adapted to transmit rotary drive power from the first transmission shaft to the second transmission shaft, the constant velocity joint comprising:
   an outer member in which a plurality of guide grooves, which are spaced apart from each other at predetermined intervals and extend along an axial direction of the outer member, are formed on an inner side wall of the outer member, the outer member being coupled to the first transmission shaft;
   an inner member having retaining members, which project respectively from an annular member toward the guide grooves, the inner member being coupled to the second transmission shaft and inserted into the outer member;
   a plurality of roller assemblies each having an inner roller, and an outer roller mounted via rolling members outwardly of the inner roller;
   wherein a plurality of contact portions, which abut against an inner circumferential wall of the inner roller, and a plurality of non-contact portions, which are separated from the inner circumferential wall of the inner roller, are disposed respectively on each of the retaining members, and the contact portions and the non-contact portions are alternately arranged;
   the contact portions at least are a parallel site in which a virtual tangent line is in parallel with a longitudinal direction of the guide grooves, and an orthogonal site in which a virtual tangent line on the contact portion is perpendicular with respect to the longitudinal direction of the guide grooves; and
   in a lateral cross section of each of the retaining members passing through a center of the retaining members and the orthogonal site, the orthogonal site includes a curved surface shape having in this order from a side in proximity to the annular member a first arcuate portion, and a second arcuate portion continuous from the first arcuate portion and having a radius of curvature smaller than a radius of curvature of the first arcuate portion.

2. The constant velocity joint according to claim 1, wherein, in the retaining member, a diameter in the horizontal cross section of the second arcuate portion gradually becomes smaller as a distance from the annular member increases.

3. The constant velocity joint according to claim 1, wherein the retaining member is of a cross-like shape as viewed in plan.

4. The constant velocity joint according to claim 1, wherein the inner circumferential wall of the inner roller is of a circular arcuate shape having a minimum inner diameter at an intermediate portion in the axial direction.

\* \* \* \* \*